United States Patent
Metcalf

(10) Patent No.: US 7,177,402 B2
(45) Date of Patent: Feb. 13, 2007

(54) VOICE-ACTIVATED INTERACTIVE MULTIMEDIA INFORMATION PROCESSING SYSTEM

(75) Inventor: Michael D. Metcalf, Trabuco Canyon, CA (US)

(73) Assignee: Applied Voice & Speech Technologies, Inc., Foothill Ranch, CA (US)

( * ) Notice: Subject to any disclaimer, the term of this patent is extended or adjusted under 35 U.S.C. 154(b) by 0 days.

(21) Appl. No.: 09/796,946

(22) Filed: Mar. 1, 2001

(65) Prior Publication Data

US 2002/0122541 A1   Sep. 5, 2002

Related U.S. Application Data

(60) Provisional application No. 60/187,181, filed on Mar. 1, 2000.

(51) Int. Cl.
    H04M 1/64    (2006.01)
(52) U.S. Cl. ............... 379/88.03; 358/402; 379/88.01; 379/88.02; 379/100.13; 704/239; 704/270; 455/563
(58) Field of Classification Search ............ 379/88.01, 379/88.02, 88.03, 88.18, 88.19, 100.13; 358/402; 455/563; 704/239, 270
    See application file for complete search history.

(56) References Cited

U.S. PATENT DOCUMENTS

| | | | | |
|---|---|---|---|---|
| 5,091,931 A | * | 2/1992 | Milewski | 379/100.13 |
| 5,125,022 A | * | 6/1992 | Hunt et al. | 379/88.02 |
| 5,659,597 A | * | 8/1997 | Bareis et al. | 379/88.01 |
| 5,675,507 A | * | 10/1997 | Bobo, II | 709/206 |
| 5,878,117 A | * | 3/1999 | Minakami et al. | 379/88.01 |
| 5,901,203 A | * | 5/1999 | Morganstein et al. | 379/88.02 |
| 5,912,949 A | * | 6/1999 | Chan et al. | 379/88.01 |
| 6,098,043 A | * | 8/2000 | Forest et al. | 379/88.01 |
| 6,445,694 B1 | * | 9/2002 | Swartz | 379/88.01 |
| 6,477,240 B1 | * | 11/2002 | Lim et al. | 379/88.01 |
| 6,563,911 B2 | * | 5/2003 | Mahoney | 379/88.03 |
| 6,707,580 B1 | * | 3/2004 | Bloomfield | 358/402 |
| 6,792,082 B1 | * | 9/2004 | Levine | 379/67.1 |

* cited by examiner

Primary Examiner—Gerald Gauthier
(74) Attorney, Agent, or Firm—Anatoly S. Weiser, Esq.

(57) ABSTRACT

Embodiments of the invention are directed to automated reception systems that may receive voice information indicating action to be taken by the system. The automated reception system may receive a call and transmit a speech message to the caller identifying actions that the caller may ask the system to take. The caller may verbally select an action for the system to execute. Possible actions may depend upon the system context and information about possible actions may be provided to the caller through dynamically generated messages. The caller may also access voicemail or electronic mail messages using embodiments of the invention. Furthermore, in some embodiments, a caller may be able to control a separate communication session using voice or other commands input during a telephone session.

24 Claims, 13 Drawing Sheets

VOICE-ACTIVATED INTERACTIVE MULTIMEDIA INFORMATION PROCESSING SYSTEM

RELATED U.S. APPLICATIONS DATA

This application claims the benefit of priority from U.S. provisional application No. 60/187,181, filed Mar. 1, 2000.

BACKGROUND OF THE INVENTION

Traditionally large businesses utilizing a large block of telephone numbers use a private branch exchange (PBX) to control the flow of incoming, internal and outgoing calls. Some of these PBX systems have been used in conjunction with automated call reception software that may allow a caller an action(s) to be taken during the call (e.g., transfer the call to a telephone extension, access voicemail messages, etc.). Some of the previous automated call reception software systems included speech recognition features allowing a caller to vocally identify the action to be taken.

In these systems, the range of actions that a caller could vocally identify was limited according to a fixed menu tree, with each branch of the menu tree having pre-specified options. The automated reception system would store digital representations of speech patterns associated with commands that a caller could select from the fixed menu tree. A digital representation of the caller's vocal identification of an action would be generated using a speech recognition engine. This digital representation would be compared to the digital representation of the speech patterns associated with commands from the fixed menu tree to determine which command the caller selected.

One significant problem associated with these systems is that their dependence on a fixed menu tree or pre-specified range of vocal commands limits their flexibility. For example, it is difficult to use these systems to allow a caller to say the name of a person whose extension the caller wishes to dial. If a company's personnel roster is fairly dynamic, new speech patterns corresponding to added employees must be continually added to the reception system's table of employees and corresponding telephone extensions. Moreover, menu introduction messages informing a user of the menu options are pre-taped and must be completely revised if the company wishes to revise the menu tree.

SUMMARY OF THE INVENTION

An object of an embodiment of the present invention is to provide an improved automated reception system that can be dynamically configured.

Another object of an embodiment of the present invention is to provide an automated reception system that can be configured using a graphical user interface.

Another object of an embodiment of the present invention is to provide an automated reception system that can translate text messages to speech.

Another object of an embodiment of the present invention is to provide an automated reception system that can be dynamically configured to receive a variety of voice instruction combinations based on a scalable architecture.

Embodiments of the automated reception system of the present invention may be suitable for receiving telephone calls, interpreting a caller's voice commands and executing actions corresponding to those commands. In embodiments of the invention, the automated reception system may inform a user of possible commands based on the state or "context" of the call. The automated reception system may construct such an informative message dynamically.

In embodiments of the invention, the automated reception system may also read text messages and translate them into speech for transmission to a caller during a telephone call.

Other features and advantages of the invention will become apparent from the following detailed description, taken in conjunction with the accompanying drawings which illustrate, by way of example, various features of embodiments of the invention.

DETAILED DESCRIPTION OF THE PREFERRED EMBODIMENTS

Embodiments of the invention are directed to automated reception systems that may receive from a caller voice information indicative of an action to be taken by the system. Although embodiments directed to automated telephone reception systems are specifically discussed herein, it will be readily understood that the invention may be applied for use with voice-over-internet protocol (VoIP) transmissions and the like. According to embodiments of the invention, the automated reception system may receive a call and transmit a speech message to the caller identifying actions that the caller may ask the system to take. The caller may verbally specify a selected action and the system may execute this action. The possible actions available to a caller may depend upon the system's context. The result of the action taken may be specified according to a context flow map.

Embodiments of the present invention may exist side-by-side with existing automated reception systems. In one embodiment of the present invention, the automated reception system may be activated by the user during a call by pressing a button (such as a pre-programmed function key) on a telephone handset, entering some combination of digits, or entering some other input during the call.

Figure 1:
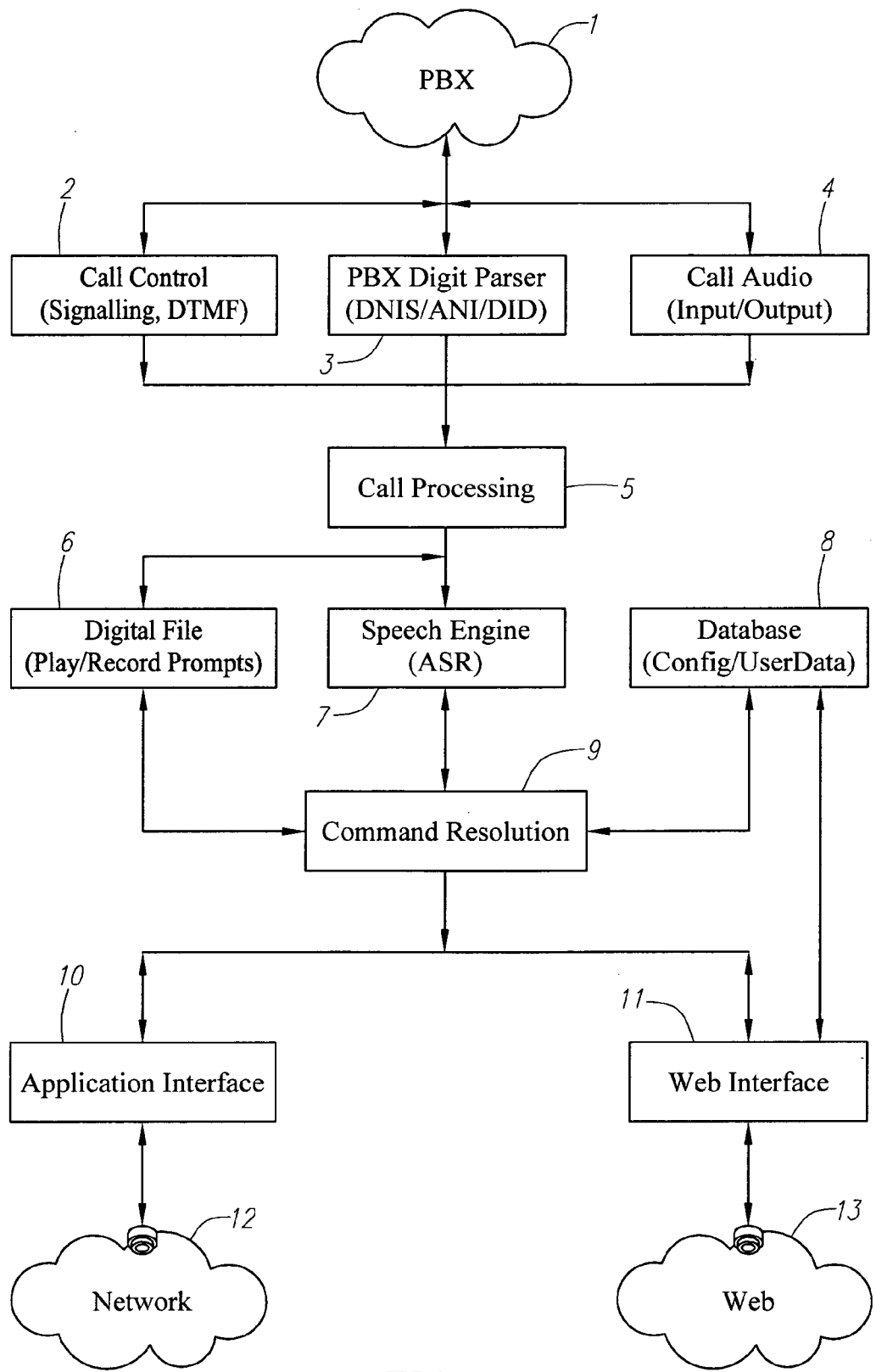
FIG. 1 illustrates an embodiment of the present invention, including components of an embodiment of an automated reception system.

FIG. 1 shows the overall flow of information among portions of an automated reception system and connected communication networks according to an embodiment of the present invention. In a telephone-specific embodiment of the invention, a telephony interface 1 may receive a telephone call from a caller. The caller may either be a subscriber (i.e., a person or entity with a telephone or other extension known to the automated reception system and having information known to the system and correlated in a form useful to the system) or an outside caller. The telephony interface 1 may be a telephone network or system, such as a private branch exchange (PBX) interface. In particular embodiments of the invention, the telephony interface 1 may be a PBX interface supported by Dialogic analog and digital telephony cards. In alternative embodiments, the telephony interface may be a Key Telephone System or a hybrid system as well as an IP based PBX or other interface supported by Network Interface Cards (NIC).

The telephony interface 1 may be connected to a call control block 2, a PBX digit parser 3, and a call audio block 4. The automated reception system 101 can be configured for use with any telephony interface that supports computer telephony (CT) integration of its calling features, including interfaces provided by hardware cards or software integration (such as that provided by Software Telephone Applications Interface (TAPI)).

In embodiments of the invention, the automated reception system 101 may send and receive call control information between the call control block 2 and a voice mail port (VMP) on the PBX. Primary information about a call offering on a VMP may be transmitted to the automated reception system 101 in the form of "winkstrings." Winkstrings are alphanumeric ASCII strings whose origin can be inband tones (DTMF) or alphanumeric data obtained and formatted by the telephony board drivers of the automated reception system 101. The winkstring may contain one or more special characters and the identity and arrangement of these special characters may indicate the nature of the call or data being received by the automated reception system 101. For a particular switch integration or telephony interface, the automated reception system 101 may have a set of rules to use in parsing a winkstring received from the telephony interface 1. For example, if the telephony interface is a Lucent Partner PBX from Lucent Technologies, Inc., the winkstring parsing rules may be as follows:

Rule 0=Outside Call:1 #<Line>##
Rule 1=XferVM:2#<Orig>#<Ext>#
Rule 2=XferVM:3#<Line>#<Ext>#
Rule 3=UserLogin:0#<Ext>#<VM>#
Rule 4=SwitchComm:0###

Figure 7:
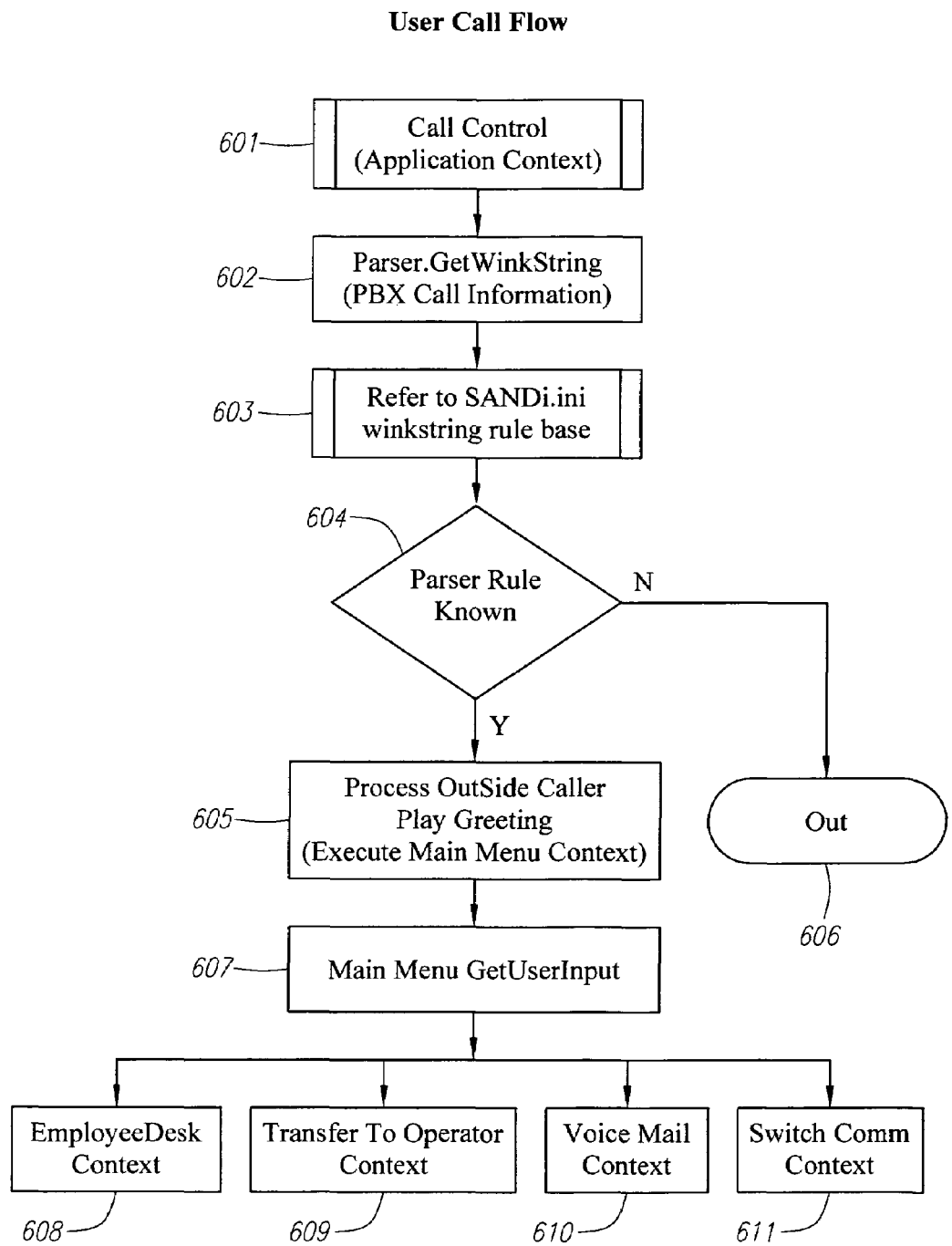
FIG. 7 illustrates call control flow in the RECEPTIONIST context according to an embodiment of the invention.

FIG. 7 illustrates call control flow in the RECEPTIONIST context according to an embodiment of the invention. In block 602, the PBX digit parser 3 may receive the winkstring from the telephony interface. It may then retrieve winkstring parsing rules (block 603) and try to match the format of each rule with the incoming winkstring to determine what type of call or information is being received. If the winkstring matches a known rule (as determined in decision block 604) the automated reception system 101 continues to process the call. This may include playing a greeting message (block 605) that informs the user of a menu of available actions that the caller may take or features that the caller may use. In response, the automated reception system 101 may receive user input indicating a feature to use or an action to take (block 606) and, based upon that input, the automated reception system 101 may transition to a appropriate application context (as shown in blocks 608 through 611). If the winkstring does not match a known rule, the automated reception system 101 will exit and allow the call to be handled by another system or by a human operator.

Embodiments of the present invention may be used with a variety of telephony interfaces, each of which may have a unique format for information that is sent to the automated reception system 101. However, in application, the automated reception system 101 may be associated with a single operational interface for long periods of operation. Accordingly, in embodiments of the present invention, the automated reception system 101 may include parsing rules corresponding to the variety of telephony interfaces with which it may be associated. In such embodiments, these rules may be stored in a system initialization file or .ini file. The automated reception system 101 may read these initialization files in response to each new call so that updates can be made to the behavior of the system on a call by call basis. The automatic reception system 101 may configure itself by applying all of the various groups of parsing rules to a first input received from the telephony interface 1 until a matching rule is found. This matching rule may indicate the type of the telephony interface 1 and the appropriate set of rules to use in future parsing. This configuration step may be performed when the telephony interface 1 is initially attached (or changed) or with each call.

Returning to FIG. 1, on an incoming call, the PBX digit parser 3 may receive from the telephony interface 1 audio digit information and translate this information into a corresponding set of numbers input by the caller. The audio digit information may be in the form of dual tone multi-frequency (DTMF) signals of the kind produced by a touch-tone telephone. The audio tone information received by the PBX digit parser 3 may correspond, for example, to a subscriber extension to which the caller wishes to be connected or to a command that the caller wishes the system to execute. In an incoming call, for example, the automated reception system may provide the caller with a choice of inputting commands either by voice or by DTMF input (i.e., pressing number keys on a touch tone phone). Where a caller chooses to enter DTMF input, the PBX digit parser may receive audio tones corresponding to numerical information associated with a command, and may translate that numerical information into numerical information that can be understood by the command resolution block 9. The PBX digit parser 3 may include a dialed number identification server (DNIS), an automatic number identification (ANI), and/or direct inward dial (DID).

The call control block 2, PBX digit parser 3, and call audio block 4 may in turn be connected to a call processing logic block 5. In particular embodiments, the call audio block 4 may pass audio data, including voice data, from the telephony interface 1 to the call processing block 5 and/or vice versa.

The call processing logic block 5 may be connected to a speech engine 7, as well as a subscriber and profile database including a digital file database 6 and a system/user configuration database 8. These elements may be connected to a command resolution block 9. The digital file database may store message prompts to be played by the automated reception system to the caller at various points during the call. The message prompts may be stored as text, as audio files (e.g., in a MIDI format) or as some combination thereof. In embodiments in which some or all of the prompts or messages are stored as text files, the message prompts may be sent to the speech engine for conversion to digital or analog representations of audio messages. Once the message prompts are converted to digital or analog representations of audio messages, they may be transmitted to the call processing block 5 and, from there, to the call audio block 3 for play. As described below, the message prompts may be dynamically generated and may change from call to call or within a call (e.g. from context to context).

The system/user configuration database 8 may contain information related to system subscribers. For example, system/user configuration database 8 may include a list of subscribers, their primary extensions, other telephone numbers at which they may be reached, voice mailbox information, etc. The system/user configuration database 8 may also store information specific to the system, such as the context flow map, function/grammar correspondence tables, and the like, which are described in greater detail hereinafter.

In embodiments of the invention, the system/user configuration database 8 may include a profile of logical flags or numerical data for each subscriber. The logical flags may indicate what features a subscriber is permitted to access. In some embodiments, the subscriber's profile may include logical flags that indicate, for example, whether the user has supplied alternate telephone numbers ("locate numbers") at which he/she may be located if there is no answer at the subscriber's primary number; whether the subscriber may screen incoming calls; whether the subscriber may dial phone numbers by voice; whether the subscriber may request that a callback number associated with a voicemail message be dialed; whether the subscriber is to be notified when new incoming voicemail messages are recorded; whether the subscriber is a system administrator; whether the subscriber has a password or needs a password to access certain features; whether to announce the data and time that a voicemail message was received; whether the subscriber may be paged on an internal PA system, and the like.

Figure 6:
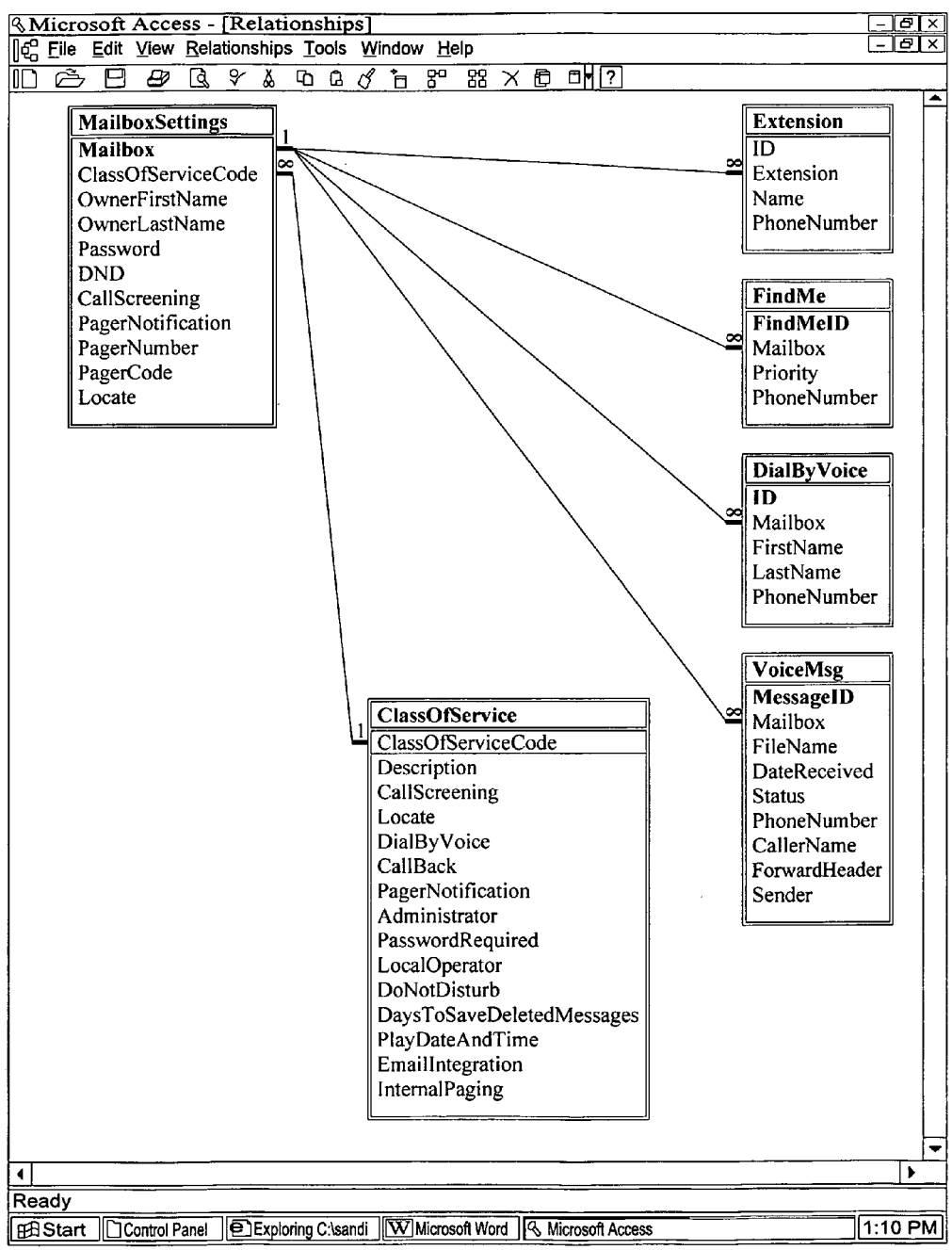
FIG. 6 shows a table schema for subscriber profile information in the system/user configuration database according to an embodiment of the present invention.

In embodiments of the invention, the subscriber profile information may include numerical information such as the number of days to save voicemail messages, the number of rings to allow at a primary number before trying alternate numbers, the locate numbers for the subscriber (in some embodiments, up to four), and the like. Subscriber profile information may be accessed by the automated reception system 101 in multiple contexts. The result of user input in a context may vary depending upon the subscriber's profile information. FIG. 6 shows a table schema for subscriber profile information in the system/user configuration database according to an embodiment of the present invention.

Finally a command resolution block 9 may be connected to the digital file database 6, the speech engine 7, and the system/user configuration database 8, as well as an application interface 10 and/or a Web interface 11. The command resolution block 9 may receive text information corresponding to the caller's verbal commands from the speech engine 7. Based on this text information, the command resolution block may identify a grammar(s) spoken by the caller and look up a corresponding function to perform in the system/user configuration database 8. For example, if the text information received from the speech engine 7 indicates that the caller said the word "call," "ring," or "dial," the command resolution block 9 may parse the information returned from the speech engine 7 and correlating it to elements of grammars in command tables in the system/user configuration database 8. The command resolution block 9 may accordingly determine that the function of placing a call is to be executed. The command resolution block 9 may also look up the name of a subscriber identified by the caller. The subscriber's identity may be determined from parsing the information returned from the speech engine 7 and correlating it to elements of grammars in subscriber tables in the system/user configuration database 8. The command resolution block 9 may then look up relevant numbers to dial from the subscriber's profile information in the system/user configuration database 8. Therefore, if the caller said "Call John Smith," the call audio block 4 and the call processing block 5 may pass this audio information to the speech engine 7 for conversion to a text format. The speech engine may then pass this text information to the command resolution block 9. The command resolution block 9 would then look up the grammar "Call" and the name "John Smith" in the system/user configuration database 8.

Some entries in the function/grammar correspondence table stored in the system/user configuration database 8 may be "empty." For example, a grammar listed as "<Employees>" in the table may indicates that, with each call, the grammars are to be retrieved from a database file or some other file or storage location, a pointer to which may also be provided. The information between the brackets may be the rule or file containing the information sought. This provides the system with an easily scalable architecture that may be readily merged with existing company records and automatically updated as these records are updated.

In embodiments of the invention, subscriber names may be treated like grammars. In such embodiments, the command resolution block 9 may first attempt to look up the subscriber name in a function/grammar correspondence table. If the grammar is not found in the function/grammar correspondence table, the command resolution block 9 may attempt to look up the grammar in a list of subscribers. If the grammar is a subscriber name, the command resolution block will find the grammar in the list of subscribers and may be directed to subscriber profile information.

Based on the function selected by the caller, the command resolution block 9 may send commands or information to the application interface 10, a Web interface 11 or both. For example, if the caller's command is to "Access e-mail," the command resolution block 9 may send a command to the application interface to establish a connection to an electronic mail server and retrieve electronic mail messages stored for the caller therein.

Figure 2:
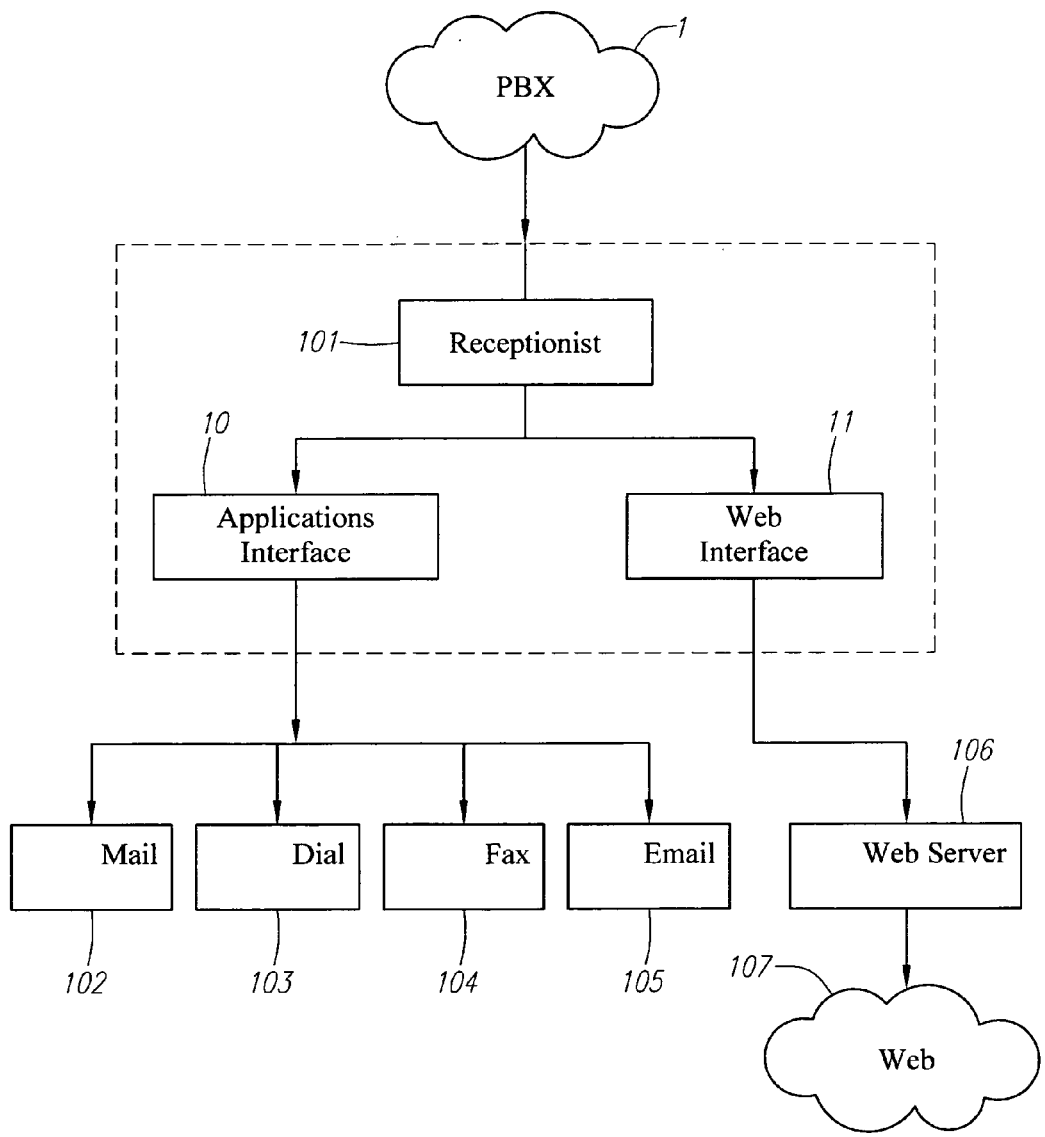
FIG. 2 illustrates an embodiment of the present invention, including a set of contexts and there associated functionalities.

As shown in FIG. 2, the automated reception system 101 (including the call control block 2, the PBX digit parser 3, the call audio block 4, the call processing block 5, the digital file database 6, the speech engine 7, the system/user configuration database 8 and the command resolution block 9) may access a voicemail system 102, a dialing system 103, a fax system 104, and/or an electronic mail system 105 through the application interface 10. Similarly, the automated reception system 101 may access a network server 106 (such as a Web server) connected to a communication network 107 (such as the Web) through the network interface 11. In embodiments of the invention, the application interface 10 may include one or more COM ports and the voicemail system 102, the dialing system 103, the fax system 104 and/or the electronic mail system 105 may be COM objects to which data is written.

In embodiments of the invention, the voicemail system 102 may access one or more digital files stored in the digital file database 6 and may store voicemail messages in the digital file database. For example, the voicemail system may cause the system to play for the caller as the called subscriber's introductory outgoing message a combination of a standard message script, a personalized message, or a combination thereof. The standard message script and/or the personalized message may be stored in the digital file database 6. In embodiments of the invention, when a caller asks to be transferred to voicemail to leave a message for a subscriber, the voicemail system 102 may receive from the call resolution block 9 one or more digital files (or combinations thereof) stored in the digital file database 6 corresponding to standard message scripts and/or the personalized messages. The identity of the digital file passed to the voicemail system 102 may depend upon the characteristics of the caller or call. For example, the subscriber's outgoing introductory message may be different depending upon whether the caller is calling from within the system or from outside the system. Moreover, multiple outgoing introductory messages may be associated with a subscriber. For example, if a subscriber is a part-time employee of the company and only works on Mondays, Wednesdays and Fridays, the outgoing introductory message for that subscriber may be different on those days than on Tuesday, Thursdays or weekend days.

The voicemail system 102 may be integrated into the command resolution block 9 and the command resolution block 9 may direct which, whether and how digital files are accessed or stored in the digital file database 6 as well as control the operation of the voicemail system 102. However, in alternative embodiments, the voicemail system 102 may be separate from the automatic reception system 101. In such embodiments, the voicemail system may include a network server connected to the Internet or another communication network and voicemail messages may be encapsulated in Multipurpose Internet Mail Extensions (MIME) format for transmission over the Internet (or other communication network) to the e-mail network server.

In embodiments of the present invention, the dialing system 103 may be the telephony interface 1 and the application interface 10 may include or be integrated into the call processing block 5, call audio block 4, PBX digit parser 3 and/or call control block 2. In accessing the dialing system, the command resolution block may pass one or more outside telephone numbers or internal extension numbers to the dialing system 103 through the application interface 10. The number passed to the application interface may include codes for allowing the system to place calls within or outside the system, interrupting other calls, etc. Audio information related to the call including messages from the automated reception system 101 to the caller may also be transmitted to the dialing system through the application interface 10. The dialing system 103 may return information relating to the status of a call, including, e.g., the number of times the target number has been rung, whether the call has been successfully completed, whether the call has been terminated, etc. to the command resolution block 9 through the application interface 10.

For example, a caller may input a command to set up a three-way conference call with two named system subscribers. The command resolution block 9 may look up the name of the first subscriber in the system/user configuration database 8 and find an internal extension number corresponding to the first subscriber. The command resolution block 9 may also look up the name of the second subscriber in the system/user configuration database 8 and determine that the second subscriber is a virtual subscriber (i.e., one that has a corresponding outside number instead of an corresponding internal extension). The command resolution block may pass the internal extension number corresponding to the first subscriber to the dialing system 103 through the application interface 10. The dialing system 103 may inform the command resolution block 9 when the call to the first subscriber has been connected/picked up. Upon being informed that the call to the first subscriber has been connected, the command resolution block may transmit a message formed from one or more digital files stored in the digital file database 6 to the first subscriber (e.g., informing the first subscriber of the identity of the caller and notifying the subscriber that it is attempting to set up a three-way conference call). The command resolution block 9 may then attempt to connect to the second subscriber by passing a number including the outside number corresponding to the second subscriber and any codes necessary to dial the outside number (e.g., a preceding "9") to the dialing system 103 through the application interface 10. When the dialing system 103 returns information that the call to the second subscriber has been connected, the command resolution block 9 may conference the first call into the second call or vice versa. Alternatively, if either call is not connected, the command resolution block 9 may so inform the caller and/or the connected subscriber.

The automated reception system 101 may have the ability to transfer calls to an office PA system. In embodiments of the invention incorporating this office paging feature, the automated reception system 101 may offer the caller the option of having the subscriber paged. Such a feature may be offered when a caller attempts to call a subscriber and the subscriber cannot be reached at an outside telephone number or an internal extension number associated with the subscriber. In an embodiment of the invention incorporating the office paging feature, the command resolution block 9 may generate a message based upon digital files stored in the digital file database 6 to be broadcast over the office PA system and may post these to a separate office PA system component.

The fax system 104 may be digital fax boards, such as GammaLink boards and a corresponding Fax context encompassing grammar/function rules which can be executed by the command resolution block 9. In embodiments of the invention, the automated reception system may allow the caller to have their fax messages e-mailed via MIME encapsulated attachments to email addresses available to the automated reception system 101 via the system/user configuration database 8. The fax system 104 may receive the message to be faxed and the receiving fax number. As another feature available in embodiments of the present invention, the automated reception system may be able to read a caller's faxes to the caller during a call. In such an embodiment, the fax system 104 may transmit information related to an incoming fax, including, e.g., content information, sender-related information, time of receipt, length/size and other information. The command resolution block 9 may translate text information related to the incoming fax into audio information using the speech engine 7 (Text To Speech, TTS) and may transmit this audio information to the call audio block 4 through the call processing block 5 for play to the caller.

In embodiments of the invention the e-mail system 105 may include a Post Office Protocol (POP) or Internet Message Access Protocol (IMAP) or Messaging Application Programming Interface (MAPI) server for retrieving electronic mail messages from a electronic mail server (not shown). In embodiments of the invention, a POP, IMAP, or MAPI server may communicate with the electronic mail server via Simple Message Transfer Protocol (SMTP) or like protocol communications. The e-mail system 105 or the application interface 10 may extract e-mail message content and/or particular elements of routing information (such as the identity of a sender, a sender's e-mail address or uniqname, or the time and date of receipt of the message by the electronic mail server) from the message or remove extraneous information from the e-mail message. The e-mail system 105 may then transfer the content and/or routing information related to the e-mail message to the application interface 10. The application interface 10 may send this information to the command resolution block 9. If the caller's specified command was to have the e-mail message read to the caller by the automated reception system 110, the command resolution block 9 may send text information related to the speech engine 7 (TTS) for conversion into audio information. The audio information may then be sent through the call processing block to the call audio block 4 for playing to the caller.

In embodiments of the invention, the automated reception system 101 may regularly poll electronic mail servers hosting electronic mail accounts associated with subscribers to determine if these accounts contain new or unread e-mail messages, to download e-mail messages in the accounts, etc. The e-mail messages may be stored in the digital file database 6, system/user configuration database 8 or some other storage location. In such systems, the automated reception system 101 may then access a caller's e-mail during a call without taking time to access a remote electronic mail server through the applications interface 10. This may make the process of retrieving e-mail using the automated reception system 1 seem seamless to the caller.

The network interface 11 may be connected to a network server 106 that is configured to transmit messages over a communication network 107. In embodiments of the invention, the network interface 11 may be a Web interface such as a Web socket. The network server 107 may be a Web server that communicates over the World Wide Web using a protocol such as SMTP.

The network server 106 may be used to provide a subscriber or system administrator with access to system or user configuration information. The information may then be displayed to a user or system administrator on a terminal (e.g., a personal computer) connected to the communication network 107. For example, if a company's roster of employee's changes, thereby requiring a system administrator to modify subscriber information in the system/user configuration database 8, the system administrator may access a Web site having Web pages that display the stored system/user configuration information to the system administrator. The Web pages may be written in HTML, Java, Java Script, C++ or the like so that they may be read by a network browser accessible by the system administrator's or user's terminal. The system/user configuration information may be presented within a graphical user interface (GUI) or via web pages in the network server 106 connected to the system/user configuration database 8 and/or the digital file database 6. Access to information may be limited to particular users or system administrators. For example, a subscriber may be able to use the network interface to change their own system/user configuration information (e.g., primary or alternate numbers, internal extension number, voicemail or e-mail password, etc.) but may be prevented from accessing similar information for other subscribers or system configuration information.

In some embodiments of the invention, the system/user configuration database may store pointers to files in another database accessible over the communication network 107 through the network interface 11 and network server 106. For example, instead of maintaining a complete list of subscribers in the system/user configuration database 8, the system/user configuration database may contain a pointer to a list of employees stored on a company server connected to the communication network 107.

In embodiments of the invention, the network server 106 may be used to retrieve content to be played to a user in the course of the call. The content may be in the form of audio files (e.g., in WAV, VOX, MP3 or other formats) or VoiceXML files. For text files, the text information may be converted to audio information using the speech engine 7 (TTS).

Figure 12:
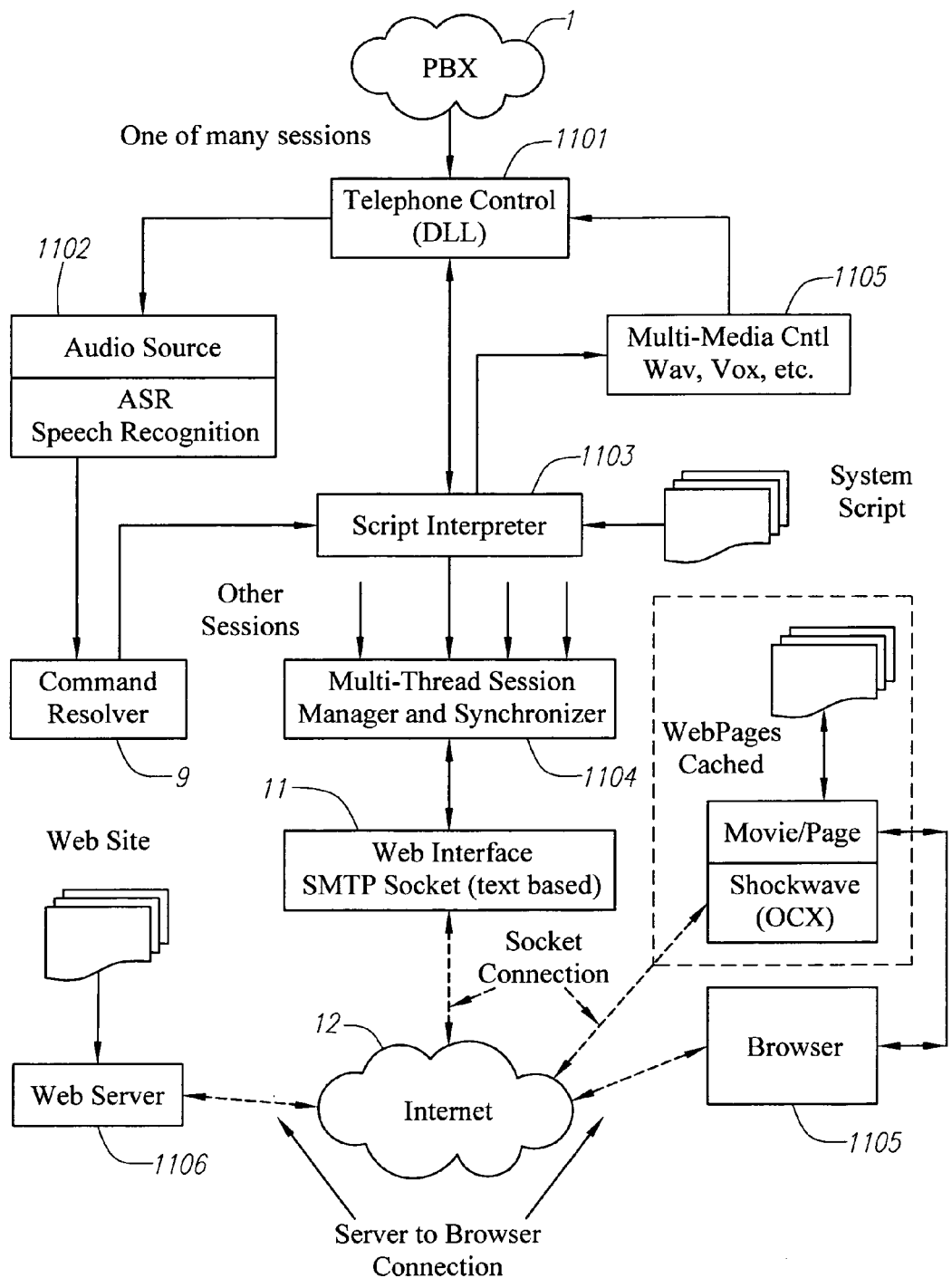
FIG. 12 illustrates an embodiment of the present invention for implementing a Web Assistant feature.
Figure 13:
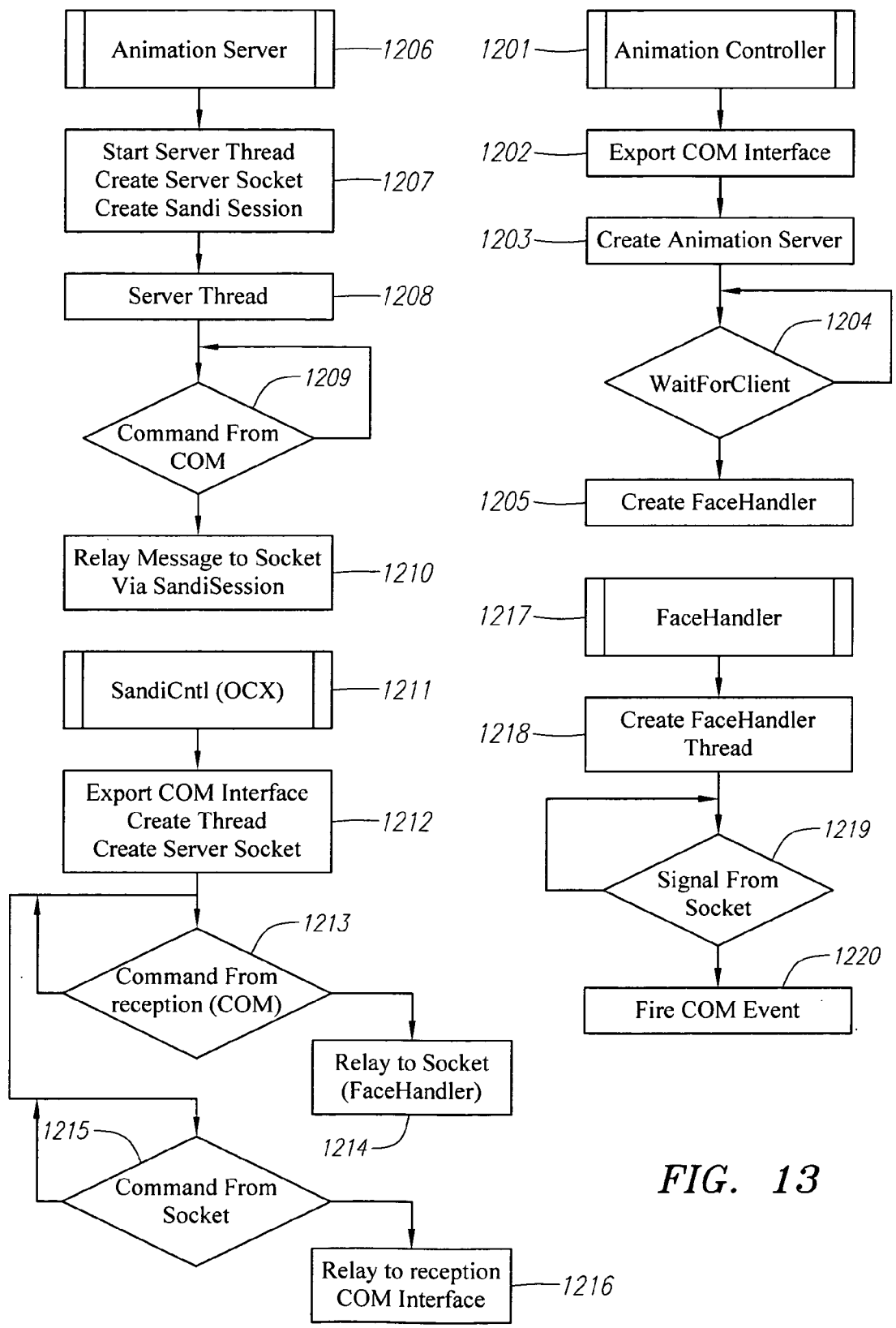
FIG. 13 depicts context flow for the WEB ASSISTANT context according to an embodiment of the invention.

Another feature (referred to as the Web Assistant feature) that may be offered by the automated reception system according to embodiments of the present invention involves using the network interface 11 to allow a caller to use voice commands to control navigation of information retrieved over the communication network 107. A user may, for example, access a Web site's host server with a personal computer connected to the communication network 107 using network browsing software, such as versions of Internet Explorer sold by Microsoft Corporation of Redmond, Wash. or Navigator sold by Netscape Communications Corporation of Mountain View, Calif. The host server may transmit to the user's personal computer a client-session specific telephone number for the user to call to use the Web Assistant feature. When the user calls the number, the call may be received by another context as shown in FIGS. 12 and 13. This context, called the Web Assistant Context, may play a message informing the user of network-related commands available to the user. The user may select a command by voice or DTMF selection and this command may be translated into a signal that mimics signals from other input devices (e.g., a mouse or keyboard) for performing the same function. The translated signal may then be sent to the host server for execution of the corresponding action. As discussed in greater detail with respect to FIG. 12, the Web Assistant Context is driven by a Script Interpreter in concert with a Command Resolver. For example the behavior of the system on each page of the target web site can be scripted via the script interpreter such that content may be made available to the user of the system in a predetermined way more suitable to an audio experience than a visual one.

In the RECEPTIONIST context, message prompts played to a caller, the commands a caller may select, the on-line help available to a caller and the functions the automated reception system may perform may depend upon the current context of the automated reception system 101, the characteristics of the call (e.g., whether the caller is calling from inside the system or outside the system), information supplied by the caller (e.g., if the caller is a subscriber, password information), and the like. Within a given context, the automated reception system 101 may process information according to a series of steps. The steps upon which a context is based are dictated by the Execute Context and Process Input methods, seen in FIGS. 3 and 4 respectively, of the particular context class being executed by the system.

Figure 3:
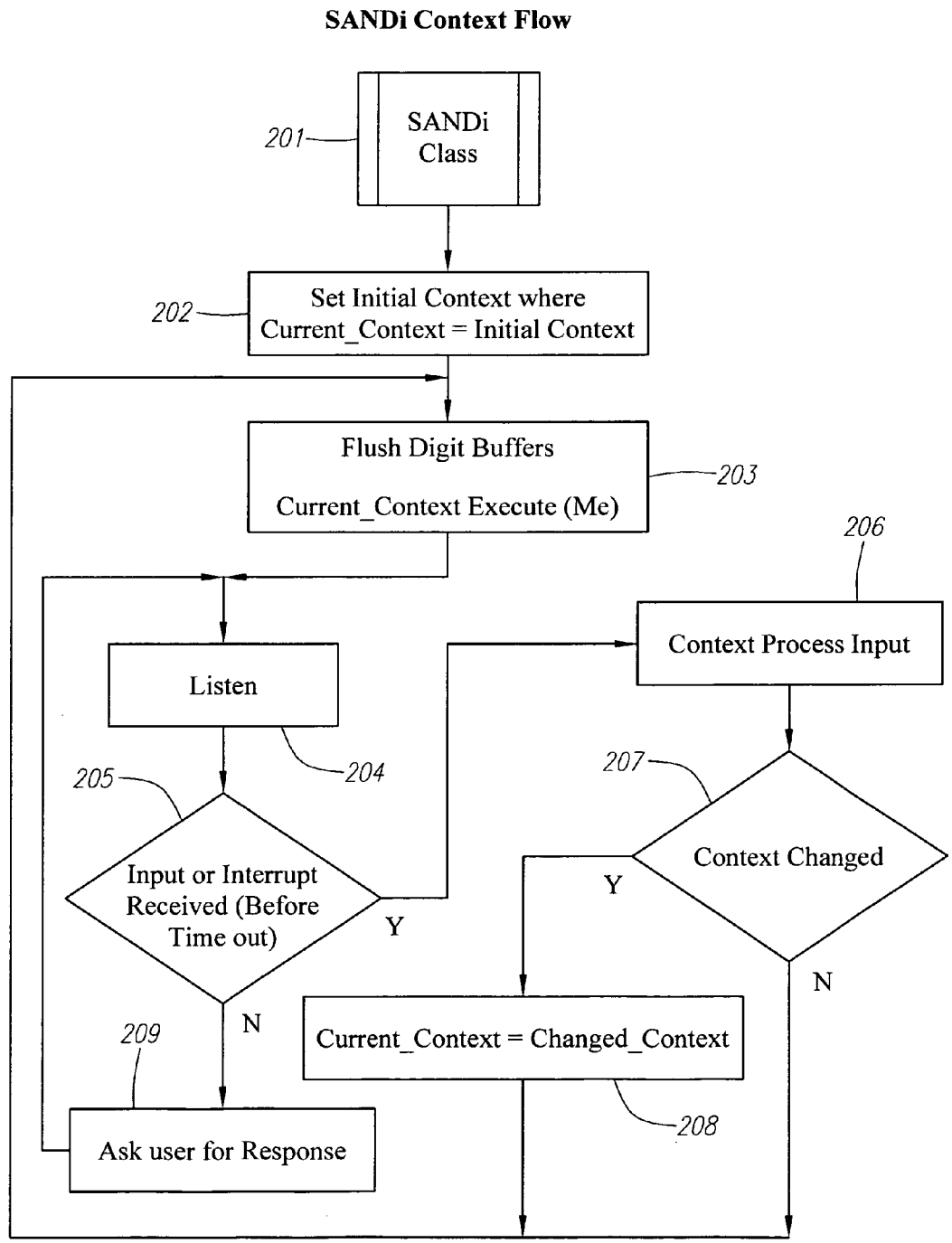
FIG. 3 illustrates a general flowchart for determination of the system context according to an embodiment of the present invention.
Figure 4:
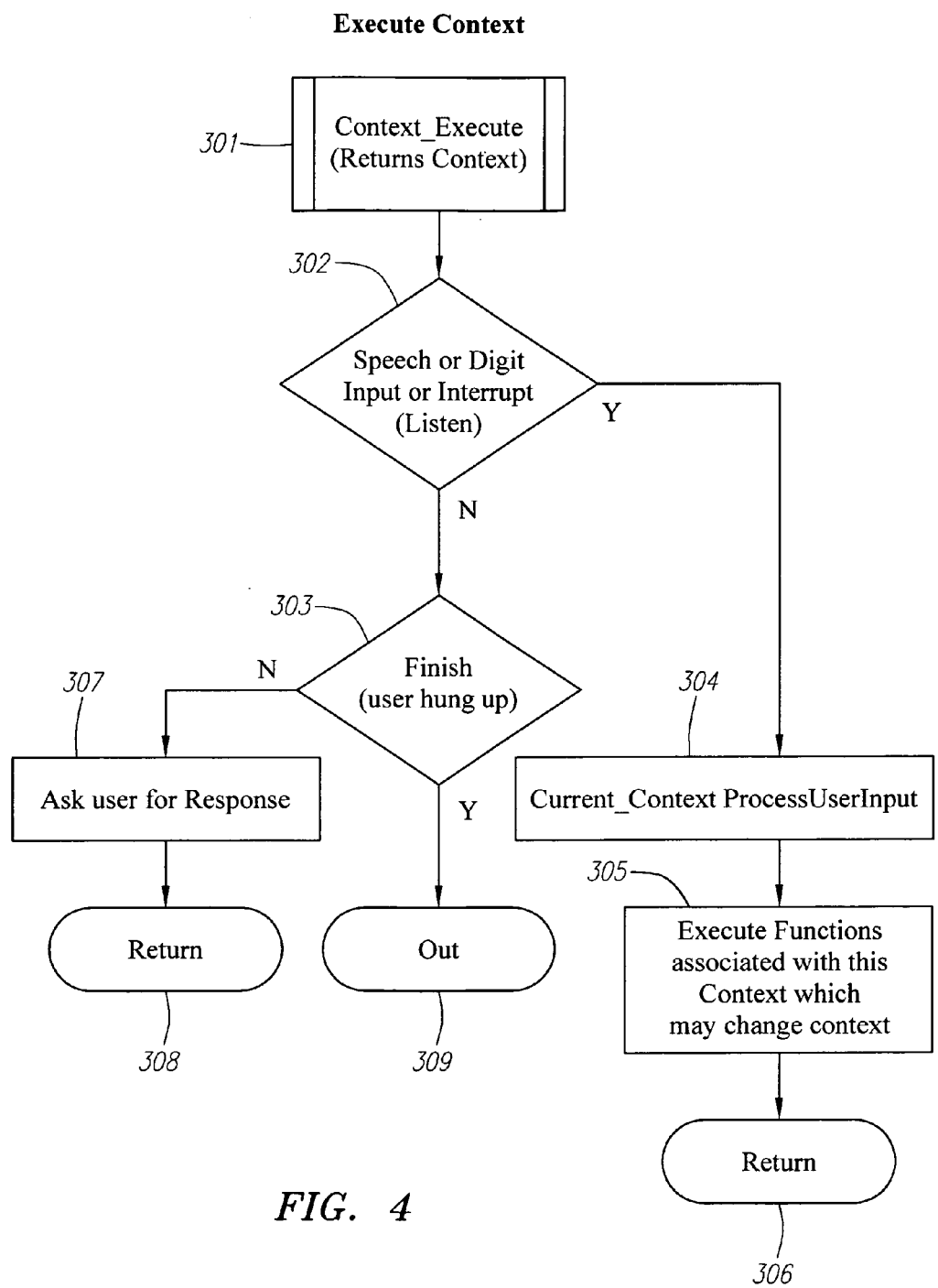
FIG. 4 illustrates a general flowchart for executing a system context according to an embodiment of the present invention.

For example, in the DIAL context, the caller may receive a message prompt asking the user to identify the name of the subscriber the caller is trying to reach. In this initial stage of the DIAL context, the automated reception system 101 may look up the name of subscriber in the system/user configuration database 8, determine the primary number to call, and attempt to transfer the call to that primary number. If the subscriber does not respond at the primary number, the automated reception system 101 may play for the caller a message prompt indicating that the subscriber could not be reached at the subscriber's primary number. The automated reception system may then ask the caller whether the caller wishes to have the automated reception system attempt to reach the subscriber at a secondary number(s), page the subscriber, transfer the caller to the subscriber's voice mailbox, or to an operator etc. If the caller indicates that he or she wishes to be transferred to the subscriber's voice mailbox, the automated reception system may change from the RECEPTIONIST context to the VOICEMAIL context. That is to say the system can change context depending on commands given by the user as illustrated in FIGS. 3 and 4. On the other hand, if the caller indicates that he or she wishes to try to reach the subscriber at a secondary number, the automated reception system 101 may remain in the RECEPTIONIST context.

FIG. 3 depicts a flowchart that may be used by the automated reception system 101 to determine its current context and change to a different context. The automated reception system 101 may start with a library of methods and call control and speech OCX objects (denominated as clsSandi in block 201). When a call is initially received from the telephony interface 1, the automated reception system 101 may start by initializing the system context to be a pre-specified initial context, as shown in block 202. After the initialization step in block 202, the automated reception system may flush a digit buffer used to store DTMF signals representing digits entered by the user and set a context variable to the value of the current context, as shown in block 203. The automated reception system 101 may then listen for DTMF, voice or other input or interrupt (block 204) along with performing other functions, such as generating or playing messages. When the automated reception system 101 determines that the user has provided input or an interrupt has occurred (decision block 205), the automated reception system may process the new input or interrupt (block 206). If this processing indicates that the system context must be changed to a new context (e.g., to VOICE-MAIL from RECEPTIONIST), as shown in decision block 207, the value of the current context will be set to the value of the new context (block 208) and return to block 203. If no input or interrupt is received in decision block 205 or if the input is received after a specified period of time for receiving input ("timeout") has expired, the automated reception system 101 may continue to listed for an input or interrupt (block 204).

In embodiments of the invention, the caller may be allowed to input an interrupt signal (such as a DTMF signal corresponding to the "#" symbol") to stop processing within a context and return the automated reception system 101 to a home state. The home state may be the same context as the first context the caller hears when initiating the call, a context for transferring to a live operator, or some other context. For example, the home state may be the MAIN MENU or RECEPTIONIST context.

FIG. 4 shows a general flowchart for the processing of input within a system context. The automated reception system 101 may enter a context, as shown in block 301 and begin executing functions based on the state of the system. The automated reception system may listen for input (as shown in decision block 302). The input may take the form of speech, DTMF, or other input or interrupt. Alternatively, the processing of context functions that occurs in block 301 may include a step in which input is requested and the system may halt processing until the input is received. If input is received (decision block 302), the automated reception system 101 may begin an input-processing procedure associated with the context (block 304) and process the input accordingly (block 305). This processing may indicate that a context change is required, in which case the context may be changed according to FIG. 3. After processing is complete, the automated reception system 101 may return to listening for input in block 302 (block 306). If no input or interrupt is received in decision block 302, the automated reception system 101 may determine whether the call has been terminated (as shown in decision block 303). The automated reception system 101 may determine that a call has been terminated if an input or interrupt has not been received for a specified period of time, if a signal indicating that the telephone connection has been lost or a ping-type signal is not returned, or the like. If the automated reception system 101 determine that the call has been terminated in decision block 303, the automated reception system may leave the context and initiate another context associated with call termination (block 309). Otherwise, if the call has not been terminated, the automated reception system 101 may remain in the current context and query the caller for a response/input (block 307). The automated reception system may then return to listening for an input or interrupt in block 302.

Figure 5:
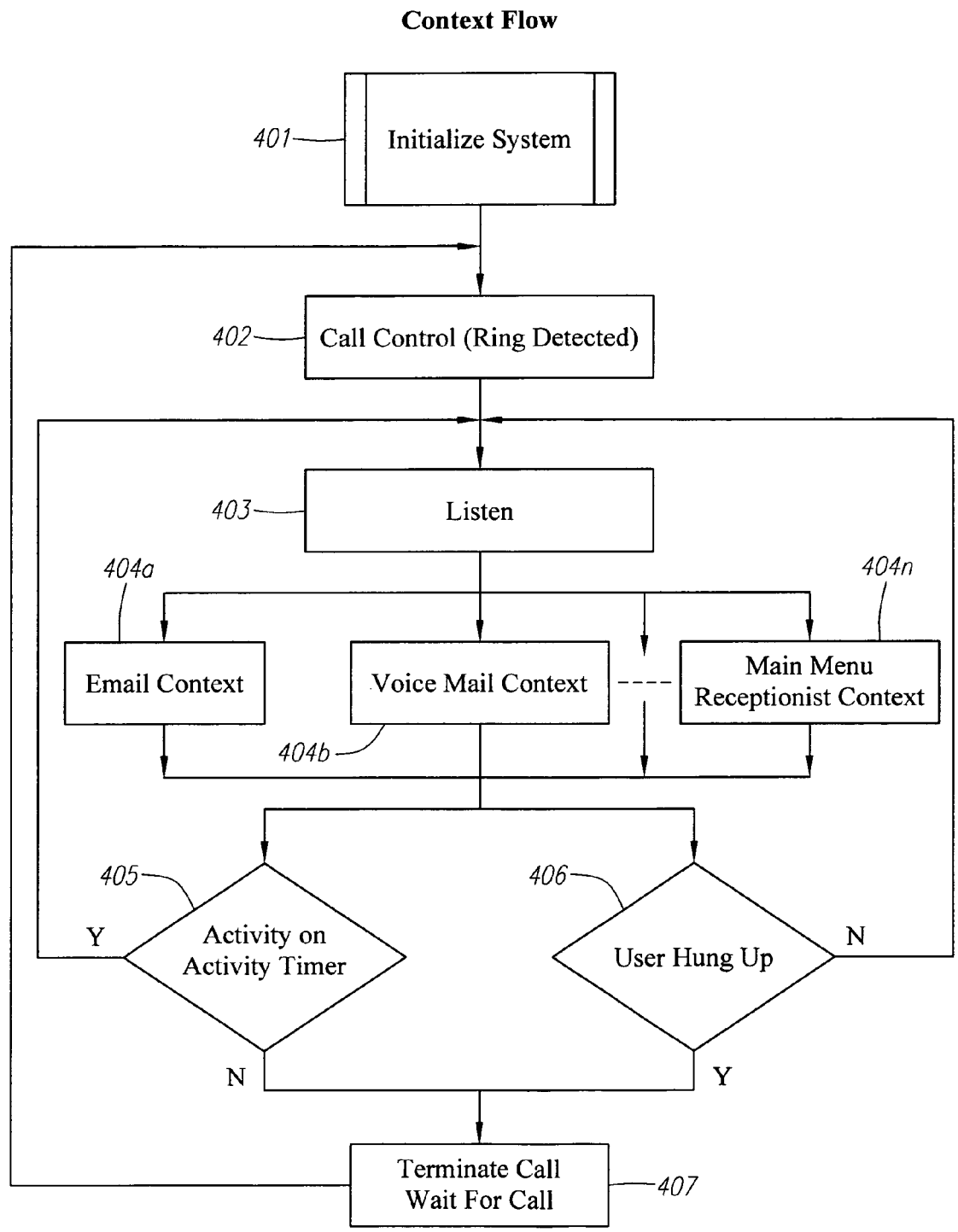
FIG. 5 illustrates the relationship among the various contexts and provides an overview of system operation according to an embodiment of the invention.

FIG. 5 illustrates the relationship among the various contexts and provides an overview of system operation according to an embodiment of the invention. The automated reception system 101 may be initialized (block 401) to initiate call control once a telephone ring is detected (block 402). The automated reception system 101 may begin in a LISTEN context (block 403) which may provide the user with top-level information as to available functional applications. Each of these functional applications may be associated with a separate context and the automated reception system 101 may transition to one of these application contexts (as shown in blocks 404a through 404n) upon receiving user input, via LISTEN, requesting the automated reception system 101 to perform a context transition to any of the associated application contexts. While executing functions and processing input within these application contexts, the system may either be returned to the LISTEN context (block 403) or any of the other application contexts (blocks 404a to 404n). Otherwise, the context may continue processing until an absence of activity (e.g., no user input) or call termination is detected (blocks 405 and 406, respectively), at which point the call may be terminated (block 407) and the automated reception system 101 may return to waiting to detect a telephone ring (prior to entering block 402).

Part of the processing performed by the automated reception system within a system context may include monitoring a call to determine whether it is still active. In embodiments of the invention, the automated reception system 101 may be configured to handle multiple calls on multiple channels. The automated reception system 101 may need to terminate a session associated with the call, indicate that the channel is available, initialize system variables, and/or store or transfer data when a call is completed. The automated reception system may determine that a call has been terminated when it receives input from the caller indicating impending call termination (e.g., the voice input "Goodbye" or a DTMF input to terminate the call) or indicating that the caller has hung up or the call has otherwise terminated (such as a "vvplinedrop" event sent by the telephony interface 1). The system may also determine that a call has been terminated if it does not receive input within a specified time period of a request for input being transmitted to the caller. In such cases, the system may enter a context in which it closes or releases a session associated with the call, initializes system variables, stores information related to the call (e.g., for diagnostic purposes) and/or waits to receive another call.

Figure 8:
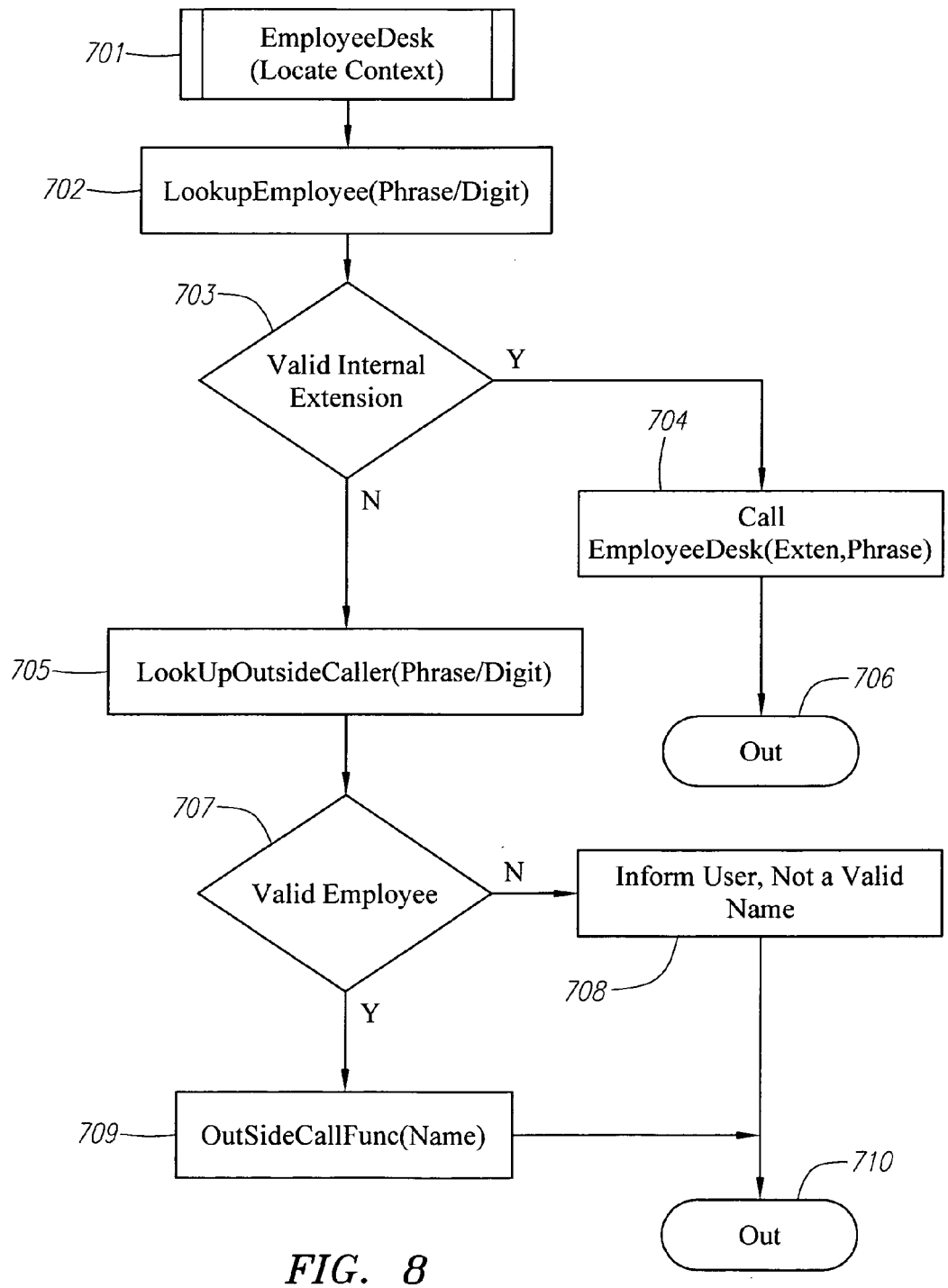
FIG. 8 illustrates the context flow in the EMPLOYEE DESK context according to an embodiment of the invention.

FIG. 8 illustrates the context flow in the EMPLOYEE DESK context according to an embodiment of the invention. The EMPLOYEE DESK context may be reached from the RECEPTIONIST context when a caller directs the system to place a call to a subscriber. A subscriber may be either an actual subscriber (i.e., with an internal extension number) or a virtual subscriber (i.e., without an internal extension number). A subscriber may also be a group of other subscribers (e.g., a company department that groups individual employee subscribers within that department, a group of employees who share secretarial support, or the like). The automated reception system 101 may enter the EMPLOYEE DESK context upon receiving the command "Call (Subscriber name)" from the caller, as shown in block 701. The subscriber's name may be extracted from this command using the speech engine 7 and a telephone number corresponding to the subscriber may be retrieved from the system/user configuration database 8. As illustrated, the automated reception system 101 may first look for a matching subscriber in a list of actual subscribers (block 702). If the subscriber has a valid internal extension number, as determined in decision block 703, the automated reception system 101 will place a call to the subscriber at that extension (block 704). The automated reception system may then enter another context, the identity of which may depend upon whether the call was or was not completed (block 706). If the subscriber does not have a valid internal extension number, the automated reception system 101 will search for a matching subscriber in a list of virtual subscribers (block 705). If no such subscriber is found (in decision block 707), the automated reception system may inform the user of its failure to find a subscriber by that name (block 708). The message may include the name of the subscriber as received by the automated reception system 101, so that the caller may know whether the caller pronounced the intended subscriber name. The message may also give the caller the option of going to a live operator (which will cause a context change) or entering a subscriber name using DTMF input. After the message is played and depending upon the results or input received, the automated reception system may exit the context (block 710). If the subscriber's name is found in the list of virtual subscribers, the automated reception system 101 may place an outside call to the retrieved telephone number (block 709). In doing so, the automated reception system may add codes to the telephone number indicating that it is to an outside number.

In an alternative embodiment, there may be a single list of all subscribers and the automated reception system 101 may search the entire list for the name of the desired subscriber. If the name is found, the corresponding telephone number may be retrieved. If necessary, the telephone number may be analyzed to determine whether it is an outside telephone number. In another embodiment, the subscriber's profile information may indicate whether the subscriber is an actual subscriber or a virtual subscriber.

Figure 9:
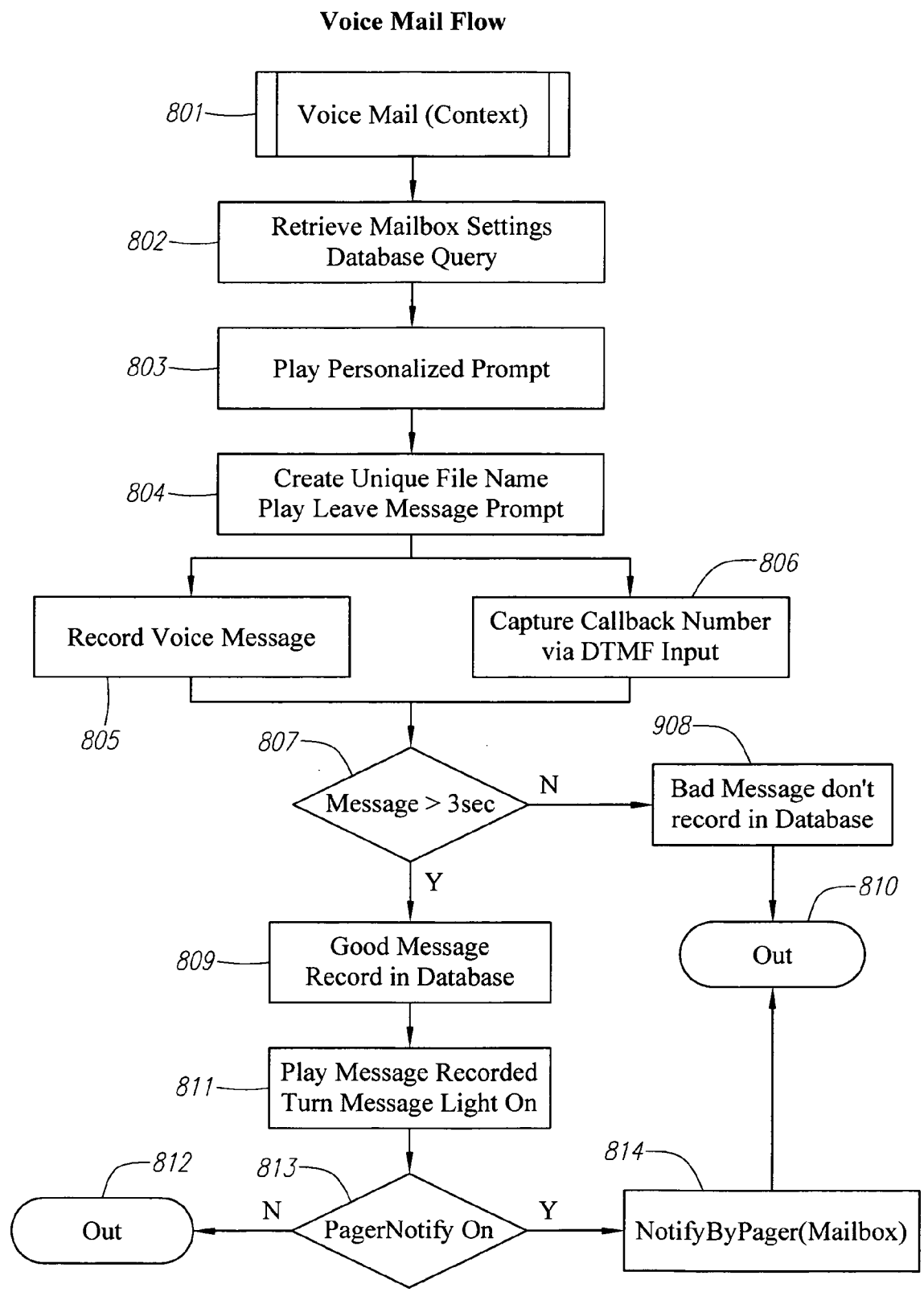
FIG. 9 depicts the context flow in the VOICEMAIL context according to which a caller would be allowed to leave a voicemail message for a subscriber in an embodiment of the system.

FIG. 9 depicts the context flow in the VOICEMAIL context according to which a caller would be allowed to leave a voicemail message for a subscriber in an embodiment of the system. When the automated reception system 101 is placed in the VOICEMAIL context (as shown in block 801), the automated reception system 101 may retrieve both general mailbox settings and mailbox settings associated with the called subscriber (as shown in block 802). This may be done by querying the system/user configuration database 8. A database record associated with a particular subscriber may include, among other information, data indicating an introductory message to be played to the caller (e.g., a selection of one out of many standard message scripts), a flag indicating whether the mailbox is full or is otherwise closed to new messages, a flag indicating whether to page the subscriber when a new voicemail message(s) is/are received, and an outside telephone number or internal extension number to be called if the caller is unable to record a voicemail message.

The automated reception system 101 may then play an introductory message for the caller (as shown in block 803). Although the term "personalized prompt" is used in FIG. 9, it should be understood that, in embodiments of the invention, a standard message prompt script may be played. In other embodiments, a standard message prompt script may be personalized by inserting information specific to the subscriber (such as the subscriber's name and telephone number) into the standard message prompt script. The introductory message may be followed by a message prompt to the caller to leave a message (such as a "beep") as shown in block 804. Also as shown in block 804, the automated reception system may open a file for recording a voicemail message either before or while it is playing the leave message prompt. The file may be identified by a unique file name. The file names may be based upon information related to the call (e.g., the subscriber's name, the time the message was left, etc.) or random numbers or characters. In embodiments of the system, file names may be recycled when a voicemail message is deleted by a subscriber. The opened file may be stored on the digital file database 6 or some other database.

The automated reception system 101 may then proceed to block 805 caller may then be allowed to record a voicemail message for the subscriber. Also, the automated reception system 101 may capture a callback number for the caller (i.e., the voicemail sender) via DTMF input (as shown in block 806) by prompting the caller to enter the digits of the callback number. In an alternative embodiment, the automated reception system may automatically capture the telephone number from which the caller is calling as the callback number. In other embodiments, the caller may say the digits of the callback number and the automated reception system 101 may use the speech engine 7 to translate the callback number into a text or other suitable format or the caller may enter the callback number via DTMF. In still other embodiments of the invention, the callback number may be captured at other points in the call—it is not necessary that the automated reception system be in the VOICEMAIL context to capture a callback number.

As shown in decision block 807, the automated reception system may measure the length of the voicemail message. This may be necessary to conserve voicemail message storage space and/or to prevent nuisance voicemails, glitches in the voicemail system, bad call transmissions (e.g., when a caller on a wireless telephone is dropped in the middle of leaving a voicemail), etc. If, for example, the length of the message is longer than a pre-specified period of time (shown as 3 seconds in FIG. 9), the automated reception system may determine that the voicemail message is a "bad" message and not record it in the opened file (block 808). In embodiments of the invention, the automated reception system may play a message for the caller indicating that the message was not recorded and may provide the caller with another opportunity to record a message (i.e., return to blocks 805 and/or 806). In embodiments of the invention, a callback number associated with the call or caller may be saved even if no message is recorded. The automated reception system 101 may then exit the VOICEMAIL context (as shown in block 810) and return to some other context, such as a HOME or MENU context.

In addition to checking whether the voicemail message is shorter than a pre-specified time period, the automated reception system may also check whether the voicemail message is longer than a pre-specified time period. In such embodiments, the pre-specified time period may be set so as to filter out "hang-up" messages, messages interrupted by the subscriber, or system glitches such as dropped calls.

If the message is within the pre-specified time period, the automated reception system 101 may determine that the message is a good message and record it in the opened file (block 809). The automated reception system 101 may then play a message for the caller indicating that the voicemail message was recorded and set an indicator for the subscriber that a message has been left (block 811). In embodiments of the invention, the indicator may be a light on the handset attached to the subscribers telephone extension or number that may be remotely lit. The indicator may inform the subscriber when a new/unheard voicemail message is stored, when any voicemail messages (including old messages) are stored or when a caller attempts to leave a voicemail message. The automated reception system 101 may determine the status of the indicator before changing its indication.

If the subscriber's mailbox settings indicate that the subscriber is to be paged when new voicemail messages for that subscriber are stored (as checked in decision block 813), the automated reception system may transfer to a NOTIFY BY PAGER context to retrieve the subscriber's paging information (e.g., a pager number) and send an electronic page to the subscriber. The electronic page can be filtered by callback number so that only messages from callback numbers specified in a filter generate an electronic page in response to the reception of a particular voicemail message. In another embodiment, the electronic page can be filtered so that electronic pages are generated only in response to the reception of a voicemail message before or after a specified time of day. In embodiments of the invention, this may take the place of setting the indicator in block 811. If subscriber does not enable the paging feature, the automated reception system 101 may exit the VOICEMAIL context and return to another context upon the request of the user, such as the RECEPTIONIST context in order to locate another subscriber (as shown in block 812).

Figure 10:
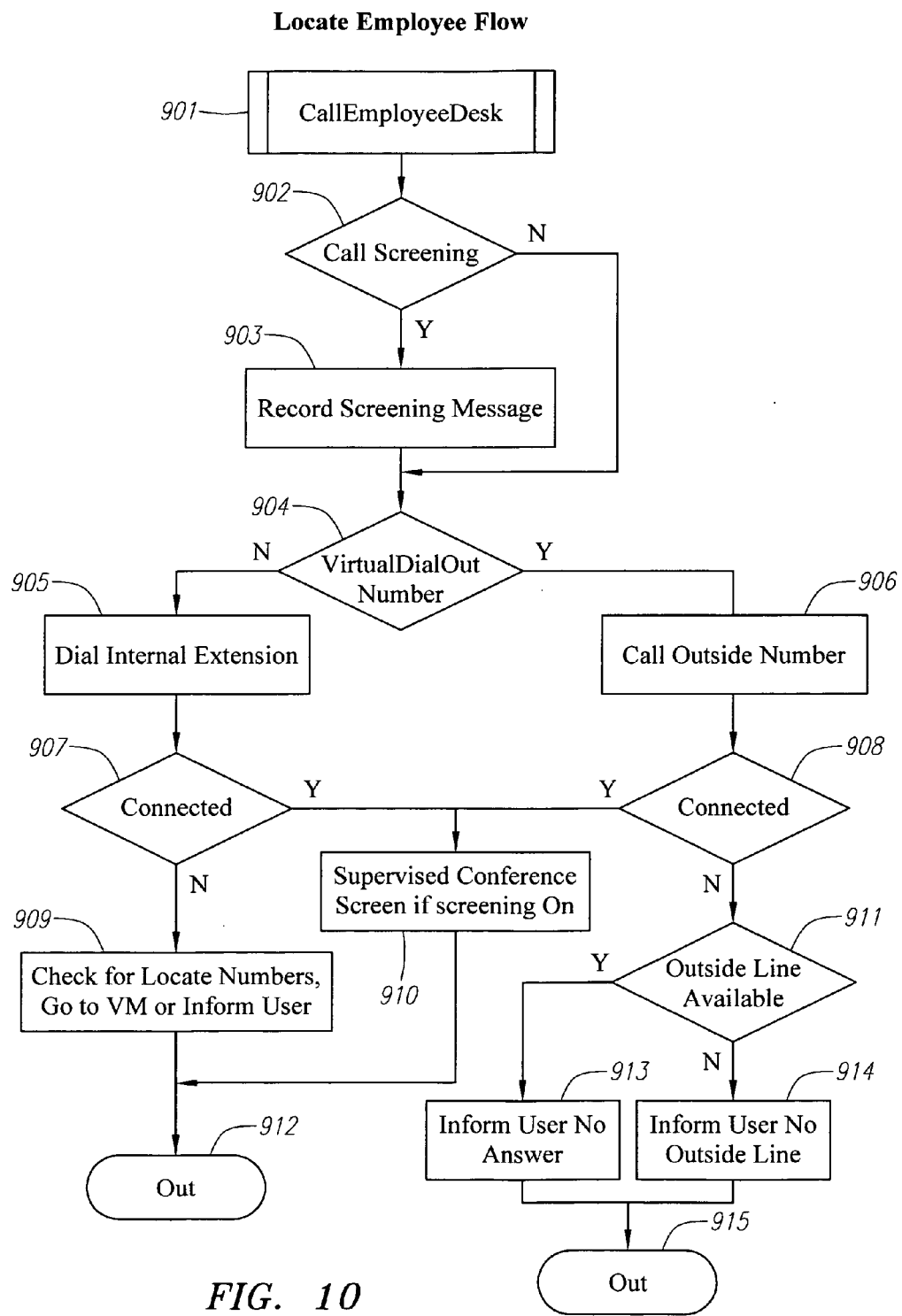
FIG. 10 illustrates the context flow for a caller locating a person with an extension, a virtual extension, or a set of locate numbers on the system according to an embodiment of the present invention.

FIG. 10 depicts the context flow of the LOCATE EMPLOYEE context according to an embodiment of the invention. The LOCATE EMPLOYEE context may be entered from the EMPLOYEE DESK context if the subscriber cannot be located at a primary telephone number and the subscriber's profile provides an alternate telephone number(s) at which the subscriber may be reached. A caller command to "Locate" in response to notification that the subscriber could not be reached at a primary number may cause such a context transition. Upon entering the LOCATE EMPLOYEE context (block 901), the automatic reception system 101 may check the subscriber's profile information to determine whether the subscriber is screening incoming calls (decision block 902). The activation of call screening may be indicated by a logical flag. If the subscriber is screening incoming calls, the automatic reception system 101 may record a screening message indicating the identity of the caller or the caller's telephone number (block 903). The screening message may be played to the subscriber and the subscriber may be offered a choice of whether or not to take the call. If the subscriber is not screening calls or if the subscriber is screening calls and the screening message has been recorded, the automated reception system 101 determines whether the alternate number retrieved from the subscriber's profile information is an internal extension number or an outside telephone number (decision block 904). If the alternate telephone number is an internal extension number, the automatic reception system 101 dials the internal extension number (block 905). If the call is connected (decision block 907), the automatic reception system may set up a supervised conference call session (to which the caller may not be a party) in which the screening message is played to the subscriber and the subscriber is allowed to indicate whether the call should be connected (block 910). Depending on whether the call is taken or not, the automatic reception system 101 either connects the call or transitions to another context (e.g., the RECEPTIONIST context). If the call is not connected in decision block 907, the automated reception system 101 may try other alternate numbers as shown in block 909 (repeating the process previously described). When all locate number are exhausted, the automatic reception system 101 may transition to another context such as the RECEPTIONIST context (block 912).

If the alternate number is an outside telephone number (block 906) and it is connected (decision block 908), the automated reception system may proceed to block 910 and follow a procedure similar to that for an internal extension number. If the call is not connected in decision block 908, the automated reception system may check whether the failure to connect was caused by a lack of available outside lines (decision block 911) and inform the user if that was the reason for the connection failure (block 914). If outside lines were available, the automatic reception system 101 may inform the user that there was no answer at the alternate telephone number, as shown in block 913. In either case, the automated reception system may transition out of the context (block 915).

Figure 11:
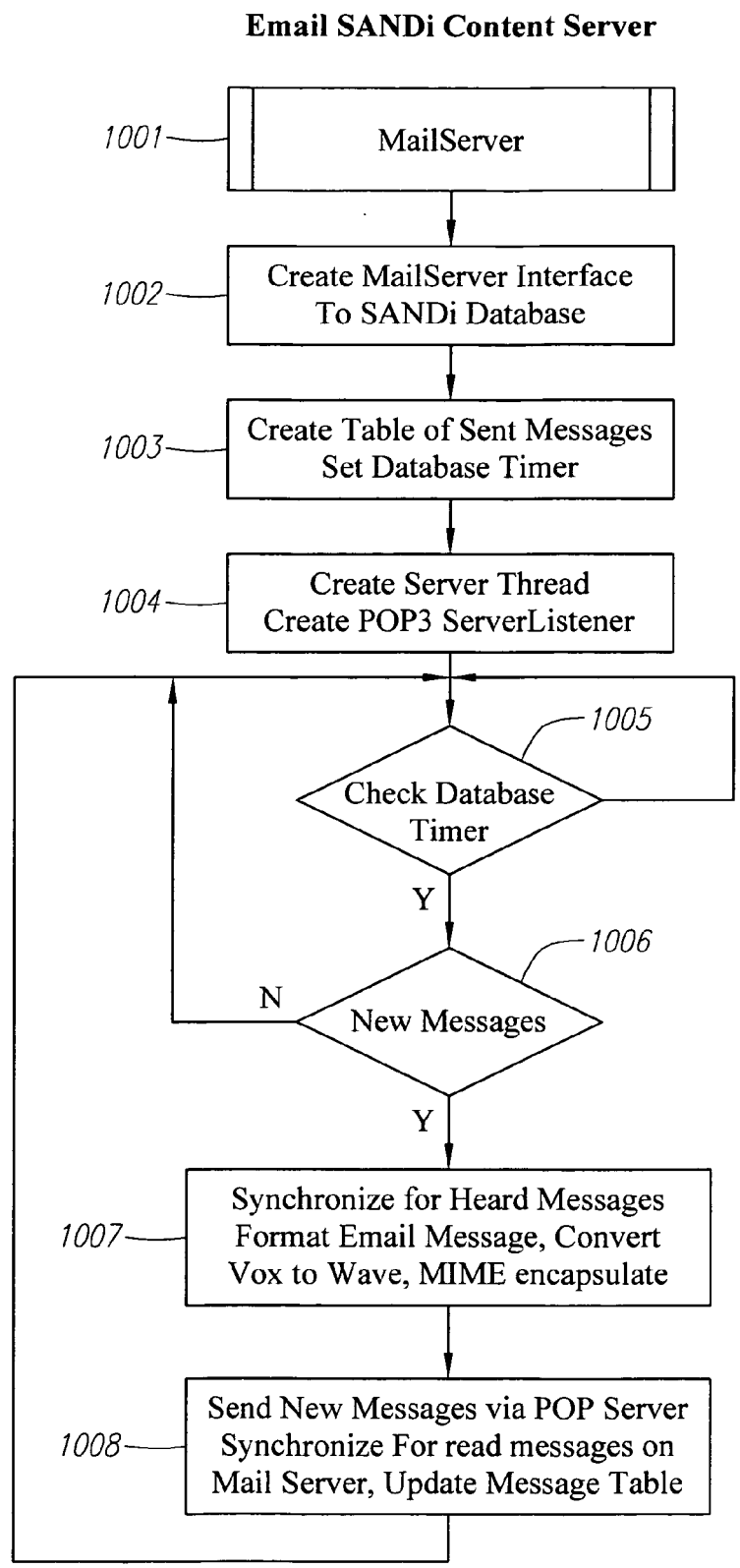
FIG. 11 depicts context flow for sending voicemail messages to a subscriber in the form of electronic mail in the E-MAIL context according to an embodiment of the invention.

FIG. 11 depicts context flow for sending voicemail messages to a subscriber in the form of electronic mail in the E-MAIL context according to an embodiment of the invention. Upon entering the E-MAIL context (block 1001), the automatic reception system 101 may establish a Mail Server system interface between the e-mail system 105 and the digital file database 8 or some other database, as shown in block 1002. This may involve configuring the application interface 10 or a portion thereof to receive information from the command resolution block 9 for transmission to the e-mail system 105. The automated reception system 101 may also create or update a table of previously sent voicemail messages and set a database timer (block 1003). In embodiments of the invention, the list of previously sent voicemail messages may be a list of all voicemail messages including a logical flag (message ID) associated with each message indicating whether the message has been previously sent. The time interval for which the database timer is set may be specified by the subscriber as part of the subscriber's profile information. The Mail Server system may setup a server thread to an electronic mail server within the e-mail system 105 so that voicemail capabilities are not disturbed by the process of transmitting recorded voicemail messages in electronic mail form (block 1004). The Mail Server system may also monitor the connection to the electronic mail server to ensure that it is active and functional. In decision block 1005, the Mail Server system checks if the database timer's interval has elapsed. If so, the automated Mail Server system checks for new (i.e., previously unsent) voicemail messages (decision block 1006). If either the database timer has not elapsed or there are no new voicemail messages, the automated reception system returns to decision block 1005. In alternate embodiments, the automated reception system may establish the server thread and electronic mail server interface after it has determined that the database timer has elapsed and that there are new messages to transmit.

If there are unheard messages to transmit, the Mail Server system may reformat them (for example, from VOX format to WAV format) and MIME encapsulate them into an electronic mail message (block 1007). At this step, the system may determine which messages are unheard, although in alternate embodiments, that determination may be made as the list of unsent messages is created (in block 1003). Finally, the new voicemail messages may be sent to the electronic mail server and the list of unsent messages may be revised to so indicate (block 1008.)

In embodiments of the present invention, a Web Assistant feature may be provided that allows a user accessing information from a remote host over a communication network 107 to issue commands to the host using the automated Web Assistant. The feature involves establishing a telephone connection that is separate from the user's communication with the host over the communication network 107. The telephone connection may be synchronized with the user's communication with the host. Since the connection are separate, the telephone connection can be used to provide the user with help from a live source while the content from the host is still being displayed on the user's network-connected terminal or computer.

Where the system involves multiple client-sessions, DID numbers unique to a client-session may be displayed on each client terminal or computer. When the user calls the DID number associated with its client-session, the system is able to identify which client-session user is activating the feature based on the DID number that is called.

The Web Assistant may include: visual objects (such as, illustrations, 3-D graphics, animation, video and/or movie clips in .AVI or .MOV format and/or animations created using other computer programs such as Flash or Director from Macromedia or Poser from MetaCreations); audio objects (such as, sound bytes, music, sound effects, prerecorded messages, record and play messages or other sounds which can be stored, indexed or replayed from various media types); control objects (such as, desktop control buttons, voice-recognition commands, touch-tone commands, application interface commands, and the like); and storage objects (such as, .ini files, text files, database files, database functions, stored procedures, database architecture, ODBC, RDO, ADO and other database interfaces and the like).

The Web Assistant may appear on a display device associated with a user's network-connected terminal or computer. The Web Assistant may synchronize and combine visual, audio, behavior, function and menu clips to create an animation or movie. The animation action may correspond to actions taken by the user at a network-connected terminal or computer or during a telephone call.

FIG. 12 illustrates an embodiment of the present invention for implementing a Web Assistant feature. The telephony interface 1 may be connected to a telephone control block 1101 (which may incorporate a call control block 2, PBX digit parser 3, call audio block 4 and call processing block 5). The audio source/ASR speech recognition block 1102 may incorporate a speech engine 7 and subscriber and profile database (including a digital file database 6 and a system/user configuration database 8) and may be connected to a command resolution block 9. The command resolution block 9 and the telephone control block 1101 may send control information to a script interpreter 1103. The script interpreter may also be supplied with a system script, which may be dynamic and contain objects. Based on the system script and the control inputs, the script interpreter 1103 may send control output to the telephone control block 1101, a session manager and synchronizer 1104 and a multi-media control block 1105. The session manager and synchronizer 1104 may use the input from the script interpreter to start thread sessions with the network interface 11.

The network interface may send and receive information from the communication network 12, which may, in turn, be connected to the user's browser 1105 (which may reside on the user's terminal or computer) and a network server 1106. The network server may host Web pages or other content that may be cached and combined with a "movie page" of animation related to the Web Assistant to form a index page that is transmitted to and displayed on the user's browser. The Web Assistant animation may be in the form of a Shockwave object inserted into the scripting file of the Web pages or other content accessed by the user from the network server 1106.

FIG. 13 depicts context flow for the WEB ASSISTANT context according to an embodiment of the invention. An animation controller may be executed (block 1201). The animation controller may be a multithreaded server that mediates a telephone-web session between the reception system and the web page being navigated by voice. The animation controller may export a COM object interface (block 1202) to the automated reception system 101 and create an animation server (block 1203), which may enabling each channel of the reception system to control a web session. After being created by the animation controller, the animation server may create a server thread and socket and establish a client-server session with the FaceHandler once a client has connected (block 1207) and a COM connection to the automated reception system 101. When a client connects to the Web Assistant feature (as determined in decision block 1204), the animation controller creates a FaceHandler to control the animation on the web, page in response to user commands made to the automated reception system 101 (as shown in block 1205). If the automated reception system 101 generates a COM method call in response to a user's request, the animation server relays the command via the socket connection (block 1214) to the FaceHandler. The FaceHandler may receive the socket signal from the SandiCntl(OCX) in block 1211 and relay the instructions to the animation on the web site and to the web site pages. In response to these various instructions the web site may change pages, execute animations, execute sequences of graphic art, go to page anchors, play audio clips, etc. The automated reception system 101 may post the command to the socket (as shown in blocks 1213 and 1214). The FaceHandler may receive the signal from the socket (block 1219) and fire the COM event (block 1220), which may control Shockwave and other animations as well as relay alphanumeric information to all of the pages of the web site in order to execute the command originated at the automated reception system 101.

In embodiments of the invention, data may be passed in the form of Visual Basic (VB), Object Linking and Embedding (OLE), OLE Custom (OCX), Component Object Model (COM), and/or ActiveX objects. For example, in an embodiment of the invention, the Web interface may be treated as a COM object.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes that come within the meaning and range of equivalency of the claims are therefore intended to be embraced therein.

What is claimed is:

1. An automated reception system for processing a telephone communication session originating with a caller, said system having a plurality of subscribers, said system comprising:
   a telephony interface;
   a computer readable medium encoded with profile information related to said plurality of subscribers;
   a voice data input configured to receive word voice data from the caller;
   logic adapted to compare said word voice data of a name to names within said profile information related to said plurality of subscribers;
   logic adapted to identify a target subscriber based upon said word voice data of the name of the target subscriber;
   fax logic capable of receiving a fax sent to said target subscriber; and
   logic adapted to translate information in the received fax into text and read the text to the caller.

2. The system according to claim 1, wherein said logic adapted to translate is capable of translating content information in the received fax and reading the content information to the caller.

3. The system according to claim 2, wherein said fax logic is capable of identifying sender-related information in the received fax, and said logic adapted to translate is capable of reading the sender-related information to the caller.

4. The system according to claim 1, further including:
   a display device configured to display a graphical user interface, said graphical user interface including a graphical representation of said profile information for one of said plurality of subscribers; and
   an input device for receiving from a user data for changing said profile information related to said one of said plurality of subscribers.

5. The system according to claim 4, wherein said user is one of a subscriber and a system administrator.

6. The system according to claim 1, further including a computer readable medium encoded with audio information.

7. The system according to claim 1, further comprising logic adapted to encapsulate audio information provided by said caller in a MIME format message, and an interface to a communication network, said interface configured to transmit said MIME format message over said communication network through said interface.

8. The system according to claim 7, wherein said communication network is one of an intranet and the Internet.

9. The system according to claim 1, further comprising logic adapted to generate a message prompt using said profile information related to said target subscriber.

10. The system according to claim 9, said message prompt including information related to said fax and a command that said caller may enter to cause said logic adapted to translate to read the text to said caller.

11. The system according to claim 1, further including logic adapted to sense interrupt input from said caller and to return said system to a home state upon sensing said interrupt input.

12. The system according to claim 1, wherein:
   said caller is one of said plurality of subscribers,
   said profile information for said caller includes a password,
   said caller submits a password submission;
   the system further comprising logic capable of comparing said password submission against said password and logic capable of limiting the access of said caller to the system if said password submission does not match said password.

13. An automated reception system for processing a telephone communication session originating with a caller, said system having a plurality of subscribers, said system comprising:
   a telephony interface;
   a computer readable medium encoded with profile information related to said plurality of subscribers;
   a voice data input configured to receive word voice data from the caller;
   logic adapted to compare said word voice data of a name to names within said profile information related to said plurality of subscribers;
   logic adapted to identify a target subscriber that the caller is seeking to call based upon said word voice data of the name of the target subscriber that the caller is seeking to call;
   fax logic capable of receiving a fax sent to said target subscriber; and
   logic adapted to translate information in the received fax into text and read the text to the caller;
   wherein:
   said fax logic is capable of
      identifying time of receipt of the fax, size of the fax, and sender-related information in the received fax; and
   said logic adapted to translate is capable of
      translating content information in the received fax, reading the content information to the caller, reading the sender-related information to the caller, and reading time of receipt and size of the received fax to said caller.

14. An automated reception system for processing a telephone communication session originating with a caller, said system having a plurality of subscribers, said system comprising:
   a telephony interface;
   a computer readable medium encoded with profile information related to said plurality of subscribers;
   a voice data input configured to receive word voice data from the caller;
   logic adapted to compare said word voice data of a name to names within said profile information related to said plurality of subscribers;

logic adapted to identify a target subscriber that the caller is seeking to call based upon said word voice data of the name of the target subscriber, wherein said profile information related to said target subscriber includes a first telephone number at which said target subscriber may be reached, the first telephone number being provided by said target subscriber; and logic adapted to place a call to connect the caller to said target subscriber at said first telephone number.

15. The system according to claim 14, said profile information related to said target subscriber further including a second telephone number at which said target subscriber may be reached, the second telephone number being provided by said target subscriber;

the system further including logic adapted to determine whether said call to said target subscriber at said first telephone number has been answered, and logic adapted to place a call to connect the caller to said target subscriber at said second telephone number if said call to said target subscriber at said first telephone number has not been answered.

16. The system according to claim 14, further including logic adapted to determine whether said call to said target subscriber at said first telephone number has been answered.

17. An automated reception system for processing a telephone communication session originating with a caller, said system having a plurality of subscribers, said system comprising:

a telephony interface;

a computer readable medium encoded with profile information related to said plurality of subscribers;

a voice data input configured to receive word voice data from the caller;

logic adapted to compare said word voice data of a name to names within said profile information related to said plurality of subscribers;

logic adapted to identify a target subscriber that the caller is seeking to call based upon said word voice data of the name of the target subscriber that the caller is seeking to call;

fax logic capable of receiving a fax sent to said target subscriber;

logic adapted to translate information in the received fax into text and read the text to the caller;

a display device configured to display a graphical user interface, said graphical user interface including a graphical representation of said profile information for one of said plurality of subscribers, said graphical user interface including a Web page containing said profile information for one of said plurality of subscribers;

an input device for receiving from a user data for changing said profile information related to said one of said plurality of subscribers;

a computer readable medium encoded with said profile information for said one of said plurality of subscribers; and a processor configured to host said Web page and to alter said profile information encoded on said computer readable medium based upon information received from said user.

18. An automated reception system for processing a telephone communication session originating with a caller, said system having a plurality of subscribers, said system comprising:

a telephony interface;

a computer readable medium encoded with profile information related to said plurality of subscribers;

a voice data input configured to receive word voice data from the caller;

logic adapted to compare said word voice data of a name to names within said profile information related to said plurality of subscribers;

logic adapted to identify a target subscriber from the plurality of subscribers based upon said word voice data of the name of the target subscriber, wherein said profile information for said target subscriber includes information related to an electronic mail account associated with said target subscriber;

a fax logic capable of receiving a fax sent to said target subscriber;

logic adapted to recognize a voice command from the caller requesting the system to transmit the fax by electronic mail;

logic adapted to encapsulate the fax for transmission by electronic mail in response to receiving the voice command; and logic adapted to access said electronic mail account based upon said profile information for said target subscriber and transmit the encapsulated fax via electronic mail.

19. The system according to claim 18, said information related to an electronic mail account including a location of said electronic mail account.

20. A method of controlling a computer communication session between a host computer and a browser application at a remote computing device, the communication session being conducted over the Internet, said method comprising:

establishing a telephone communication session associated with said computer communication session, the telephone communication session connecting a user at the remote computing device and the host computer;

receiving voice commands from said user in the course of the telephone communication session;

translating the received voice commands into a form useable by said host computer; and executing, by the remote host, said translated voice commands to affect information displayed by the browser application.

21. The method of claim 20, further including synchronizing said telephone communication session with said computer communication session.

22. The method of claim 20, further comprising transmitting a telephone number uniquely associated with the computer communication session to the user, wherein the step of establishing comprises the user calling the telephone number.

23. An automated reception system for processing a telephone communication session originating with a caller, said system having a plurality of subscribers, said system comprising:

a telephony interface;

a computer readable medium encoded with profile information related to said plurality of subscribers;

a voice data input configured to receive word voice data from the caller;

logic adapted to compare said word voice data of a name to names within said profile information related to said plurality of subscribers;

logic adapted to identify a target subscriber from said plurality of subscribers based upon said word voice data of the name of the target subscriber;

fax logic capable of receiving a fax sent to said target subscriber; and logic adapted to translate information in the received fax into text and read the text to the caller;

wherein:
said fax logic is capable of
identifying time of receipt of the received fax, size of the received fax, and sender-related information in the received fax; and
said logic adapted to translate is capable of
translating content information in the received fax; and
reading to the caller the content information, the sender-related information, the time of receipt, and the size of the received fax.

24. An automated reception system for processing a telephone communication session originating with a caller, said system having a plurality of subscribers, said system comprising:
a telephony interface;
a computer readable medium encoded with profile information related to said plurality of subscribers;
a voice data input configured to receive word voice data from the caller;
logic adapted to compare said word voice data of a name to names within said profile information related to said plurality of subscribers;
logic adapted to identify a target subscriber from the plurality of subscribers based upon said word voice data of the name of the target subscriber;
fax logic capable of receiving a fax sent to said target subscriber;
logic adapted to translate information in the received fax into text and read the text to the caller;
a display device configured to display a graphical user interface, said graphical user interface including a graphical representation of said profile information for one of said plurality of subscribers, said graphical user interface including a Web page containing said profile information for one of said plurality of subscribers;
an input device for receiving from a user data for changing said profile information related to said one of said plurality of subscribers; and
a processor configured to host said Web page and to alter said profile information encoded on said computer readable medium based upon information received from said user.

* * * * *